US010360362B2

(12) United States Patent
Rattner et al.

(10) Patent No.: US 10,360,362 B2
(45) Date of Patent: Jul. 23, 2019

(54) APPARATUSES AND METHODS FOR FAST ONBOARDING AN INTERNET-ENABLED DEVICE

(71) Applicant: QUALCOMM Incorporated, San Diego, CA (US)

(72) Inventors: Zachary David Rattner, San Diego, CA (US); Christopher Rudolf Wingert, Del Mar, CA (US); Robert Sean Daley, Del Mar, CA (US); Patrik Nils Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 14/266,707

(22) Filed: Apr. 30, 2014

(65) Prior Publication Data

US 2015/0317467 A1  Nov. 5, 2015

(51) Int. Cl.
*H04L 29/06* (2006.01)
*G06F 21/34* (2013.01)
(Continued)

(52) U.S. Cl.
CPC .............. *G06F 21/34* (2013.01); *G06F 21/35* (2013.01); *H04W 4/50* (2018.02); *H04W 4/70* (2018.02); *H04W 12/04* (2013.01); *H04W 84/12* (2013.01)

(58) Field of Classification Search
CPC ................................. G06F 21/34; G06F 21/35
See application file for complete search history.

(56) References Cited

U.S. PATENT DOCUMENTS 7,681,231 B2 * 3/2010 Combs et al. ..................... 726/5
8,316,438 B1 * 11/2012 Bush ........................ H04L 12/66
726/22
(Continued)

FOREIGN PATENT DOCUMENTS

CN   101778377 A   7/2010
CN   102857915 A   1/2013
(Continued)

OTHER PUBLICATIONS

International Search Report and Written Opinion—PCT/US2015/025614—ISA/EPO—dated Jun. 29, 2015

*Primary Examiner* — Brandon S Hoffman
*Assistant Examiner* — William A Corum, Jr.
(74) *Attorney, Agent, or Firm* — Loza & Loza LLP

(57) ABSTRACT

Various aspects directed towards automating an onboarding procedure are disclosed. In a first aspect, an administrative communication associated with onboarding an onboardable device is received by an access point (AP) device, such that the administrative communication originates from a device different than the onboardable device. The AP device then enables the onboardable device to access a secure network based on the administrative communication. In another aspect, an identifier is transmitted from an onboardable device while the onboardable device operates in an AP mode. The onboardable device then receives credentials associated with accessing a secure network via an AP device. Here, the credentials received from the AP device are in response to an authentication of the identifier by an administrator. The onboardable device then connects to the secure network by utilizing the credentials.

10 Claims, 14 Drawing Sheets

(51) Int. Cl.
*G06F 21/35* (2013.01)
*H04W 12/04* (2009.01)
*H04W 4/50* (2018.01)
*H04W 4/70* (2018.01)
*H04W 84/12* (2009.01)

(56) References Cited

U.S. PATENT DOCUMENTS

| | | | |
|---|---|---|---|
| 8,375,210 B2* | 2/2013 | Miller | 713/168 |
| 8,571,600 B2 | 10/2013 | Sarkar et al. | |
| 8,948,390 B2* | 2/2015 | Scott et al. | 380/270 |
| 9,220,012 B1* | 12/2015 | Inamdar | H04W 12/08 |
| 9,420,524 B1* | 8/2016 | Dalvi | H04W 48/16 |
| 2006/0056634 A1 | 3/2006 | Lee et al. | |
| 2010/0299730 A1* | 11/2010 | Hamachi | H04L 9/321 726/5 |
| 2011/0289229 A1 | 11/2011 | Subramaniam | |
| 2011/0296501 A1 | 12/2011 | Drovdahl et al. | |
| 2012/0225678 A1* | 9/2012 | Cha et al. | 455/457 |
| 2012/0309371 A1* | 12/2012 | Yamada | 455/414.2 |
| 2013/0081113 A1* | 3/2013 | Cherian et al. | 726/4 |
| 2013/0223279 A1 | 8/2013 | Tinnakornsrisuphap et al. | |
| 2013/0278622 A1 | 10/2013 | Sun et al. | |
| 2014/0119298 A1* | 5/2014 | Jeon | H04W 48/20 370/329 |
| 2014/0247941 A1* | 9/2014 | Gu et al. | 380/270 |
| 2014/0281478 A1* | 9/2014 | Huang et al. | 713/150 |
| 2014/0282902 A1* | 9/2014 | Zou | H04L 63/08 726/4 |
| 2014/0328209 A1* | 11/2014 | Lu | H04W 72/048 370/254 |
| 2014/0328334 A1* | 11/2014 | Viswanathan | H04W 12/06 370/338 |
| 2014/0369232 A1* | 12/2014 | Kim | H04W 60/00 370/254 |
| 2015/0139025 A1* | 5/2015 | Lee | H04W 76/021 370/254 |
| 2015/0172905 A1* | 6/2015 | Qi | H04W 8/005 370/338 |
| 2015/0289247 A1* | 10/2015 | Liu | H04B 7/0413 370/329 |

FOREIGN PATENT DOCUMENTS

| | | |
|---|---|---|
| CN | 103188824 A | 7/2013 |
| JP | 2006025113 A | 1/2006 |
| JP | 2007074297 A | 3/2007 |
| JP | 2009071682 A | 4/2009 |
| JP | 2011029985 A | 2/2011 |
| JP | 2011259159 A | 12/2011 |
| JP | 2014060623 A | 4/2014 |

* cited by examiner

APPARATUSES AND METHODS FOR FAST ONBOARDING AN INTERNET-ENABLED DEVICE

TECHNICAL FIELD

Aspects of the present disclosure relate generally to wireless communication systems, and more particularly, to automating an onboarding of a device to a secure network.

BACKGROUND

"The Internet of Everything" describes a paradigm where large varieties of devices and appliances include embedded intelligence to communicate over the Internet. Peer-to-peer frameworks may be used to enable devices to recognize and share information with each other over a Wi-Fi interface. Utilizing a peer-to-peer framework, however, often requires "onboarding". Onboarding refers to the initial association of a device into a user's network (e.g., a home Wi-Fi network), which generally includes an exchange of credential information to authorize the new device. A simple example is if the user purchased a new Internet-enabled toaster, and upon installation at the user's home the toaster is onboarded onto the user's personal secure network. Of course, if a next-door neighbor also has a personal secure network, the credential exchange is needed to be sure the toaster is onboarded to the correct user's network.

Onboarding has traditionally been implemented by requiring the user to input credentials manually (e.g., a password) for the network via the new device's user interface (e.g., keyboard, touchscreen, etc.). However, onboarding becomes a problem with devices that lack a user interface. As sensors, actuators, and other devices such as light bulbs enter the home in the Internet of Everything paradigm, detecting these devices in a simple and secure manner becomes increasingly important.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method and apparatus directed towards automating an onboarding procedure from within an access point (AP) device. Here, an administrative communication associated with onboarding an onboardable device is received by the AP device. For this particular implementation, the administrative communication originates from a device different than the onboardable device. The AP device then enables the onboardable device to access its secure network based on the administrative communication.

Another aspect of the disclosure provides a method and apparatus directed towards automating an onboarding procedure from within an onboardable device. In this implementation, an identifier is transmitted from an onboardable device while the onboardable device operates in an AP mode. The onboardable device then receives credentials associated with accessing a secure network via an AP device. Here, the credentials received from the AP device are in response to an authentication of the identifier by an administrator. The onboardable device then connects to the secure network by utilizing the credentials.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

As stated previously, onboarding problems arise when devices without inputs or displays need to be registered with a secured network. Accordingly, some aspects disclosed herein are directed towards automatically and securely onboarding a device onto a home network as soon as the device is powered on. For instance, unlike conventional systems, the aspects disclosed herein do not require that the onboardable device have an input method to enter a service set identifier (SSID) or password. Moreover, rather than requiring such user input via the onboardable device, aspects for automating an authentication of the onboardable device to access a secure network via an enhanced router is disclosed.

Figure 1:
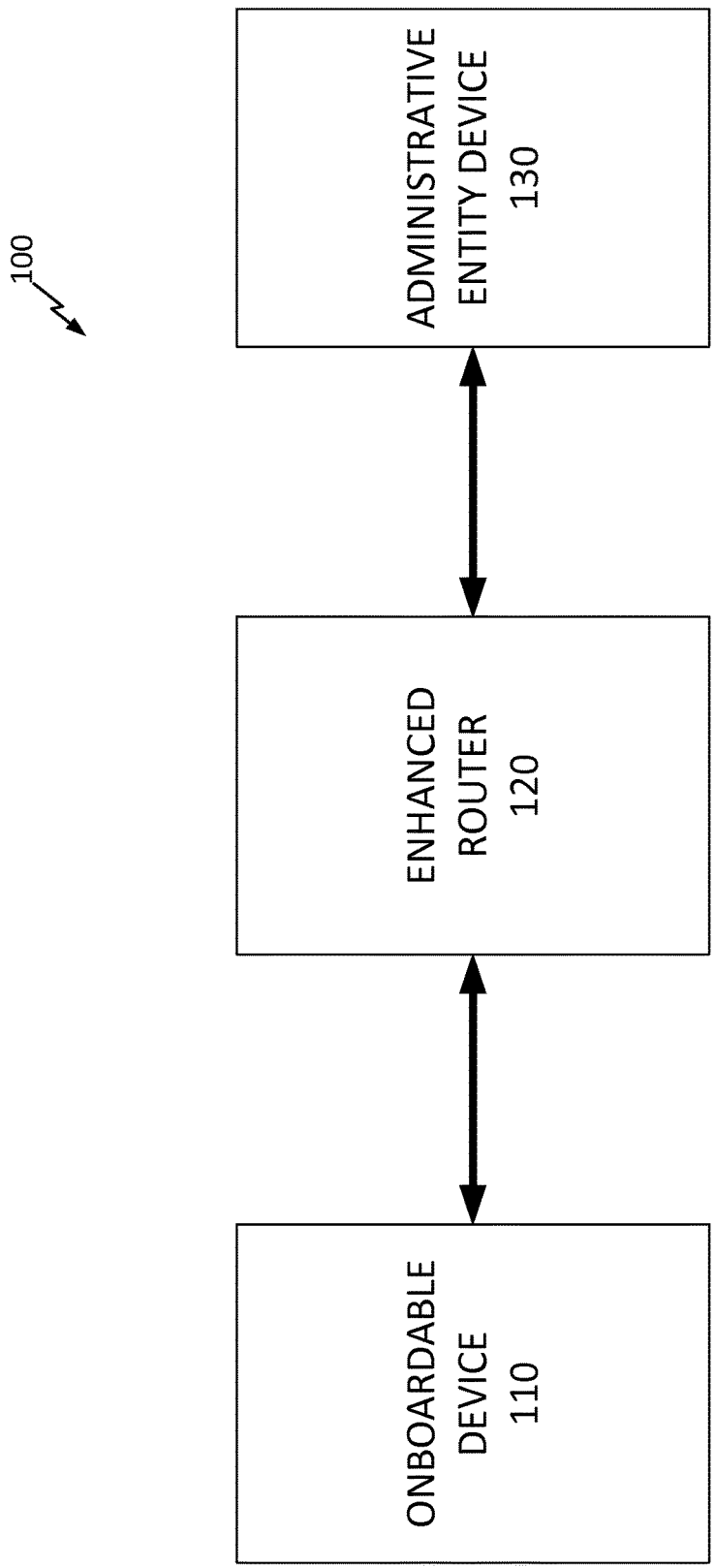
FIG. 1 shows a block diagram of an exemplary system for implementing an automated onboarding procedure according to an aspect of the disclosure.

Referring next to FIG. 1, a block diagram of an exemplary system for implementing an automated onboarding procedure according to an aspect of the disclosure is provided. As illustrated, system 100 comprises onboardable device 110, enhanced router 120, and administrative entity device 130. In a particular aspect, onboardable device 110 is configured to access a secure network via enhanced router 120, wherein communications between onboardable device 110 and enhanced router 120 are facilitated by utilizing a peer-to-peer framework. An exemplary peer-to-peer framework that may be utilized is an AllJoyn architecture, which is an open source peer-to-peer framework which enables abstractions of low-level network concepts and application program interfaces (APIs). To this end, it is contemplated that onboardable device 110 is a device that requires credential information to join a personal Wi-Fi network, whereas enhanced router 120 is an access point (AP) device configured to provide credential information to onboardable devices, such as onboardable device 110, to access a personal Wi-Fi network.

In an exemplary use scenario, upon being powered on, onboardable device 110 operates in an AP mode and broadcasts an SSID of a predetermined format, which allows enhanced router 120 to identify onboardable device 110 as an onboardable device. That is, it is contemplated that enhanced router 120 is configured to include a specialized component (e.g., a Wi-Fi or Bluetooth modem) dedicated to searching for devices to onboard. Once enhanced router 120 discovers onboardable device 110, enhanced router 120 stores the SSID broadcast by onboardable device 110, and notifies an administrator of enhanced router 120 that onboardable device 110 is attempting to onboard his/her personal network. In this particular example, such notification is received by the administrator via administrative entity device 130, wherein administrative entity device 130 is a computing device (e.g., smartphone, tablet, personal computer, etc.) configured to communicate with enhanced router 120, either directly or indirectly, via any of a plurality of communication mechanisms known in the art.

In an aspect, while enhanced router 120 awaits an authorization response from administrative entity 130, enhanced router 120 may be configured to place onboardable device 110 in a temporary "hold" status. In a hold status, although onboardable device 110 is connected to the network via enhanced router 120, such connection is filtered (e.g., via media access control (MAC) filtering) so that onboardable device 110 cannot communicate with the network until authorization from the administrator is received. To this end, instead of MAC filtering, one of ordinary skill will appreciate that any of a plurality of other mechanisms for providing limited network connectivity may be implemented.

If an authorization for onboardable device 110 is indeed received, enhanced router 120 transmits Wi-Fi credentials to onboardable device 110. Onboardable device 110 then reboots out of AP mode, and utilizes the received Wi-Fi credentials to access the personal network via enhanced router 120. Enhanced router 120 may then begin searching for other onboardable devices to onboard.

However, if authorization for onboardable device 110 is denied, no credentials are sent to onboardable device 110. In an aspect of the disclosure, enhanced router 120 may add onboardable device 110 to a list of rejected devices, which are no longer discoverable unless the administrator removes them from the list.

In the event where multiple routers can detect the same onboardable device, it is desirable to provide a schema that only allows the router's legitimate owner to onboard the onboardable device. An exemplary schema directed towards such aspects is contemplated within the context of system 100. Here, an administrator may use an already-onboarded device (e.g., where administrative entity device 130 is onboarded to enhanced router 120) to obtain a unique identifier (ID) associated with onboardable device 110. It should be appreciated that such ID can be obtained by administrative entity device 130 via any of a plurality of interfaces on administrative entity device 130. For example, a keypad or touchscreen on administrative entity device 130 may be used to manually input a text entry corresponding to the ID (e.g., an alphanumeric code labeled on onboardable device 110, and/or included in a packaging of onboardable device 110). Administrative entity device 130 can also be used to scan a two-dimensional barcode labeled on onboardable device 110, and/or included in a packaging of onboardable device 110, wherein the ID may be embedded in data output from a reading of the barcode. Rather than having administrative entity device 130 read barcodes, it is also contemplated that administrative entity device 130 may simply be used to obtain an image of the barcode, wherein a reading of the barcode is performed in another device.

Once obtained, administrative entity device 130 then sends the ID (or data including the ID) to an AP component of enhanced router 120 which then internally routs the ID to a Wi-Fi modem component of enhanced router 120. Enhanced router 120 subsequently connects to onboardable device 110 via the modem component of enhanced router 120, and transmits the ID along with Wi-Fi credentials to onboardable device 110. Onboardable device 110 then determines whether the received ID matches an internally stored ID, wherein access to the personal network is granted only if the received ID matches the internally stored ID.

In another aspect, as an alternative to continuous searching, enhanced router 120 may be configured to search for onboardable devices for only a specific amount of time after a push button is pressed. This approach would prevent all enhanced router devices from searching all the time, which increases the likelihood that the device's true owner will discover the desired onboardable device.

In yet another aspect, rather than having enhanced router 120 search for onboardable devices, a process in which onboardable device 110 searches for AP devices is disclosed. For instance, upon being turned on, onboardable device 110 may be configured to operate as a Wi-Fi client device instead of an AP device. While operating in client mode, onboardable device 110 could then scan for AP devices to onboard it, wherein any of various algorithms may be implemented to facilitate selecting which particular AP device onboardable device 110 will allow to onboard it.

Figure 2:
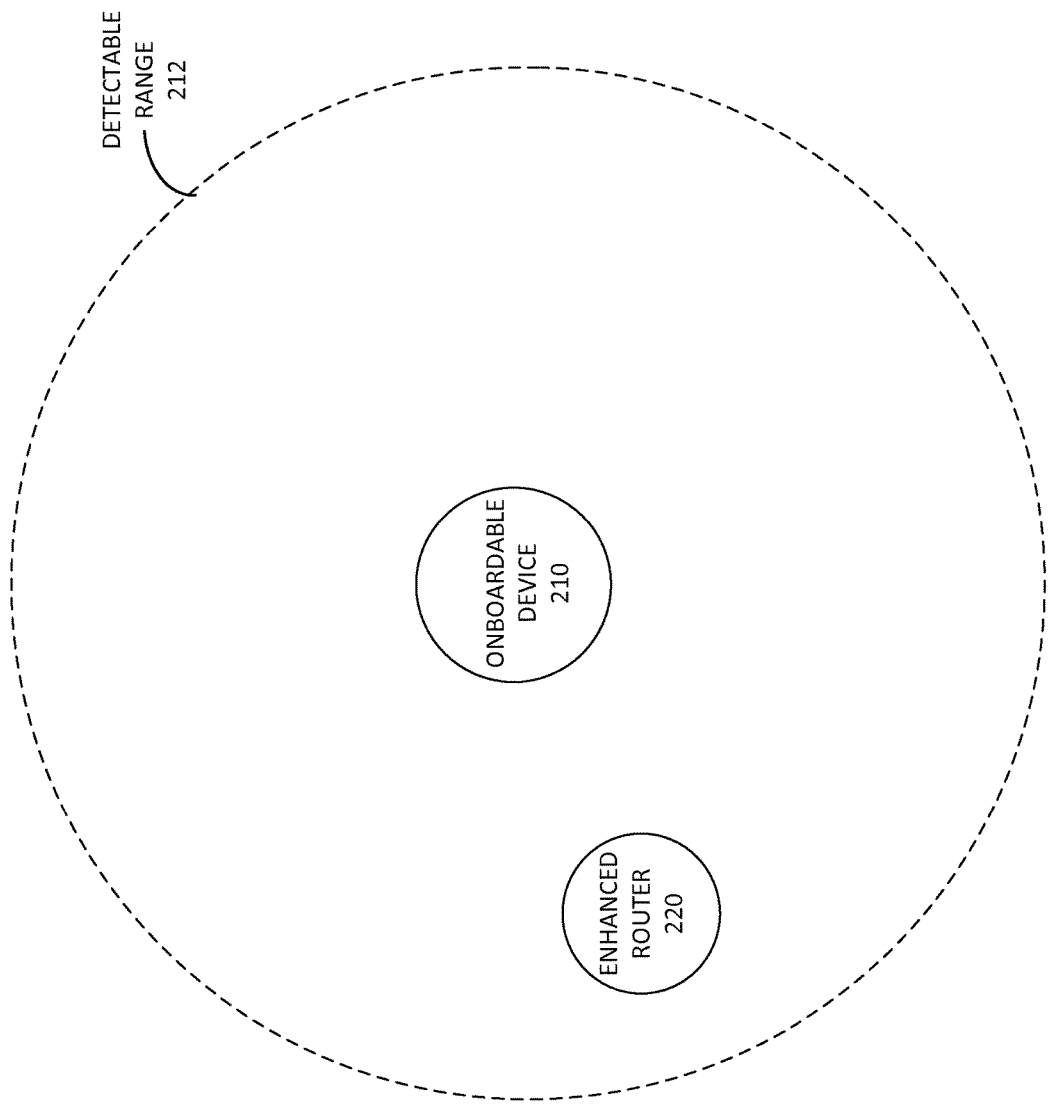
FIG. 2 illustrates a first exemplary scenario for implementing an automated onboarding procedure according to an aspect of the disclosure.

For example, as illustrated in FIG. 2, onboardable device 210 might only detect a single enhanced router 220 within detectable range 212. Under such circumstances (i.e., only one AP device is detected, and the AP device is identified as an "enhanced router", e.g., via an identifier broadcast from enhanced router 220), onboardable device 210 may be configured to select enhanced router 220 as the desired onboarder device, reboot into AP mode, and subsequently wait for enhanced router 220 to onboard it.

Figure 3:
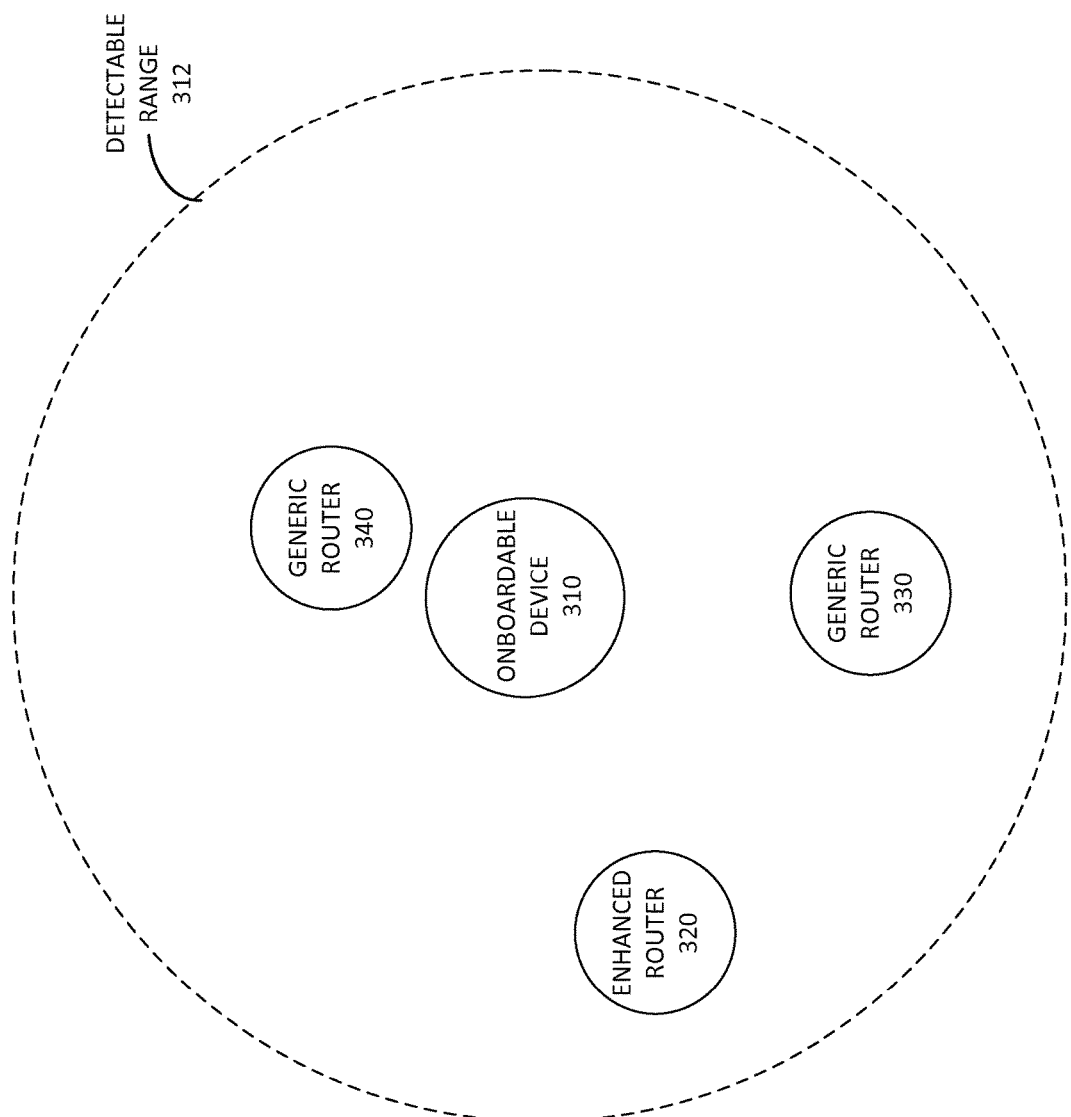
FIG. 3 illustrates a second exemplary scenario for implementing an automated onboarding procedure according to an aspect of the disclosure.

However, it is contemplated that multiple AP devices may be detected as well. In FIG. 3, for instance, onboardable device 310 detects enhanced router 320, generic router 330, and generic router 340 within detectable range 312. Within such scenarios, it is desirable to have an automated mechanism for selecting which of enhanced router 320, generic router 330, or generic router 340, onboardable device 310 will allow to onboard it. For instance, an algorithm may be implemented dictating that, where multiple AP points are detected and only one is identified as an enhanced router, the enhanced router is selected. Accordingly, by implementing such a rule to the scenario illustrated in FIG. 3, onboardable device 310 would select enhanced router 320. After selecting enhanced router 320, onboardable device 310 would then reboot into AP mode, and wait for enhanced router 320 to onboard it.

Figure 4:
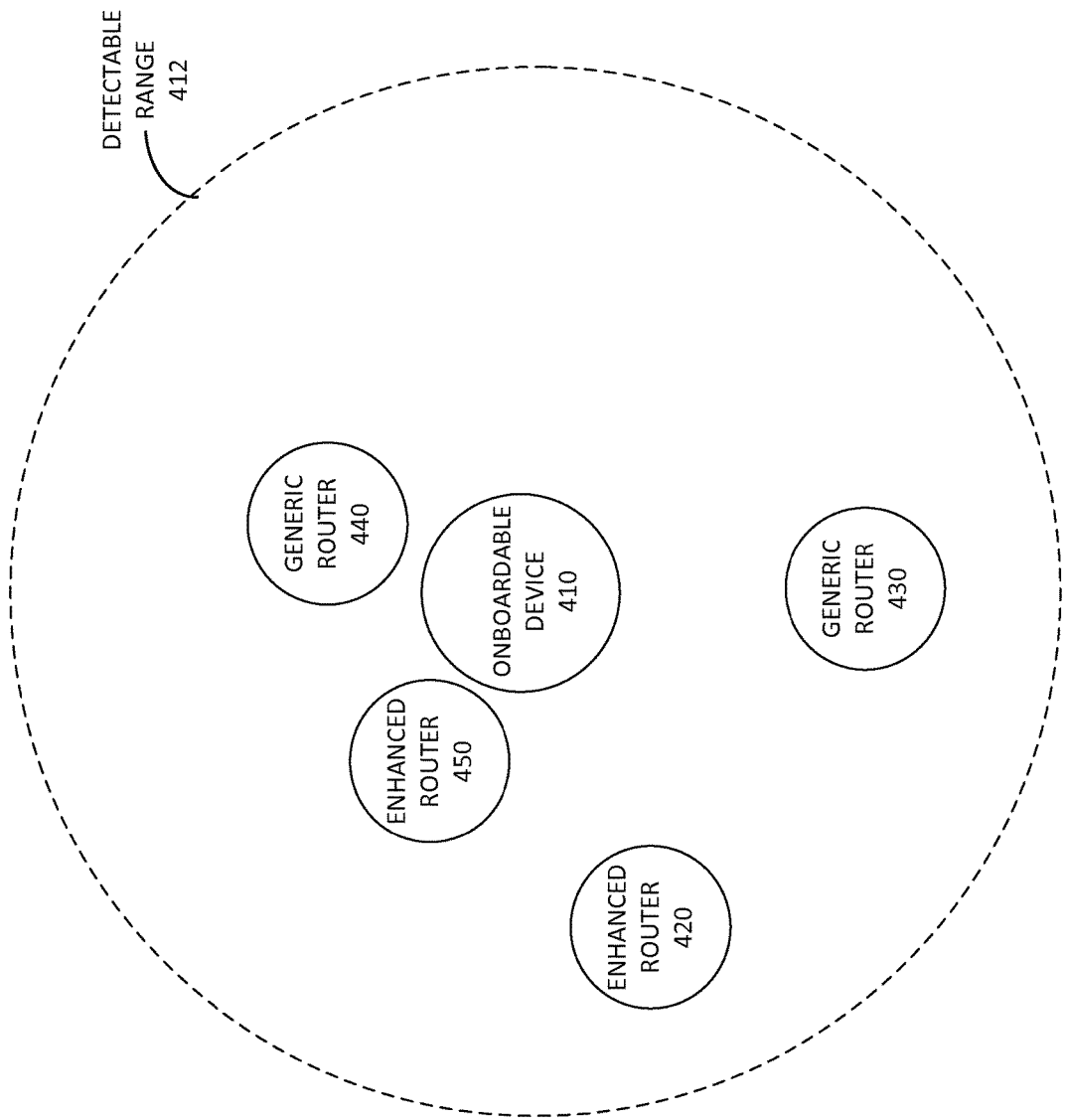
FIG. 4 illustrates a third exemplary scenario for implementing an automated onboarding procedure according to an aspect of the disclosure.

In order to accommodate scenarios in which multiple enhanced routers are detected, such as the scenario illustrated in FIG. 4, a location-based algorithm is contemplated. Here, onboardable device 410 detects enhanced router 420, generic router 430, generic router 440, and enhanced router 450 within detectable range 412. For this scenario, because multiple enhanced routers are detected, onboardable device 410 may be configured to select between enhanced router 420 and enhanced router 450 according to their respective distances from onboardable device 410. In this particular example, onboardable device 410 may thus determine that enhanced router 450 is in closest proximity by utilizing existing location-based algorithms (e.g., via a round trip time algorithm and/or by leveraging existing indoor location technologies, such as the IZat™ location platform provided by Qualcomm Atheros, Inc.). Onboardable device 410 may then select enhanced router 450, reboot into AP mode, and wait for enhanced router 450 to onboard it.

Figure 5:
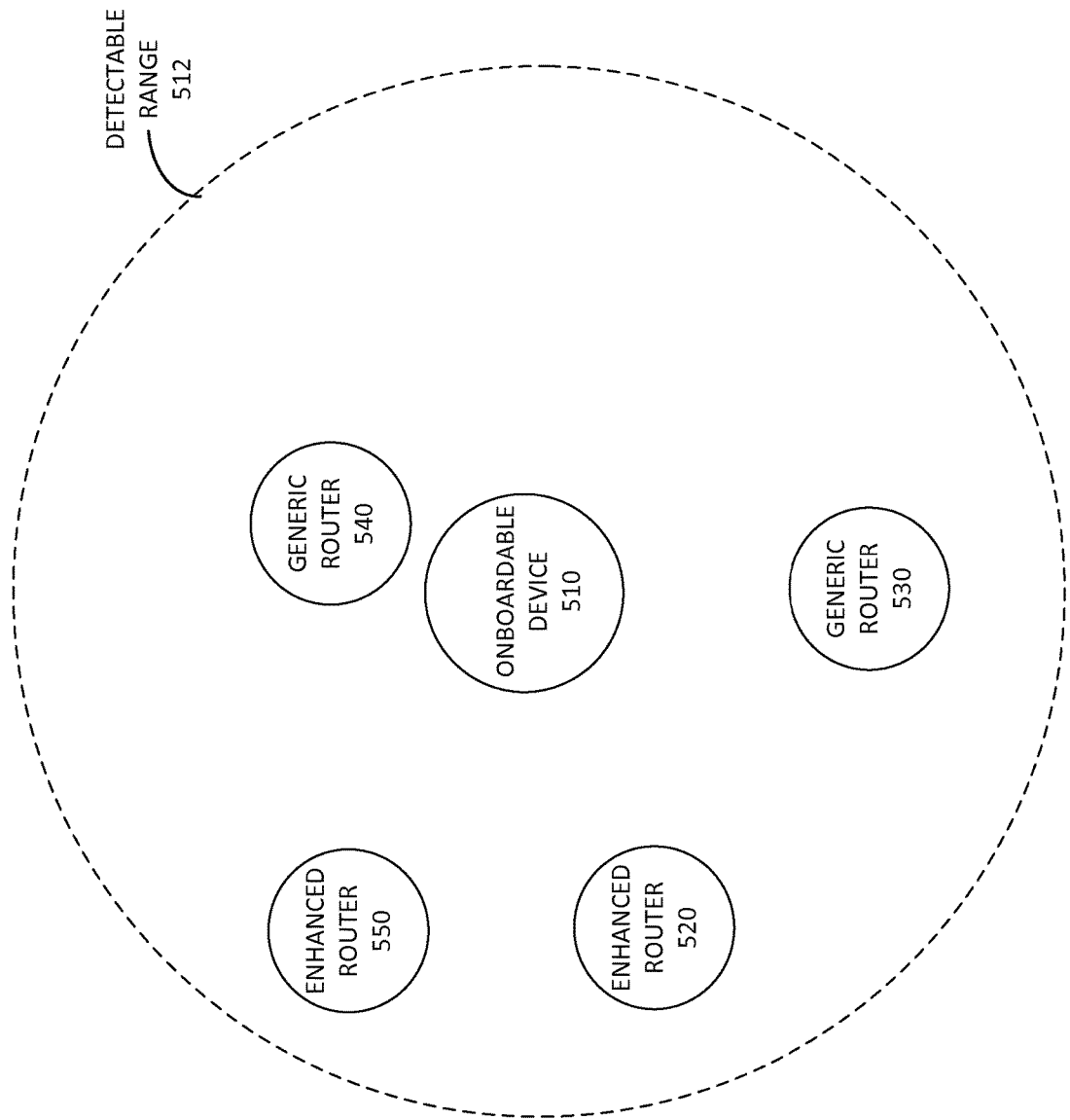
FIG. 5 illustrates a fourth exemplary scenario for implementing an automated onboarding procedure according to an aspect of the disclosure.

A different algorithm may be utilized in circumstances where the respective distances from two enhanced routers either cannot be determined, or are too close in value to ascertain which is closest. An example of such scenario is illustrated in FIG. 5, wherein onboardable device 510 detects enhanced router 520, generic router 530, generic router 540, and enhanced router 550 within detectable range 512. Here, because onboardable device 510 may be unable to determine which of enhanced router 520 or enhanced router 550 is closest, onboardable device 510 may be configured to select neither. Instead, an administrator may utilize the aforementioned process in which a unique ID associated with onboardable device 510 is forwarded to the correct enhanced router via an already onboarded device (e.g., administrative entity device 130). Onboardable device 510 would then select between enhanced router 520 and enhanced router 550 according to which one it receives its unique ID from.

Exemplary Implementations

It is contemplated that the various aspects for automating an onboarding procedure disclosed herein may be incorporated within an AP device (e.g., enhanced router 120) and/or an onboardable device (e.g., onboardable device 110). Accordingly, exemplary implementations of these aspects are provided below, as incorporated within an AP device and onboardable device, respectively.

Figure 6:
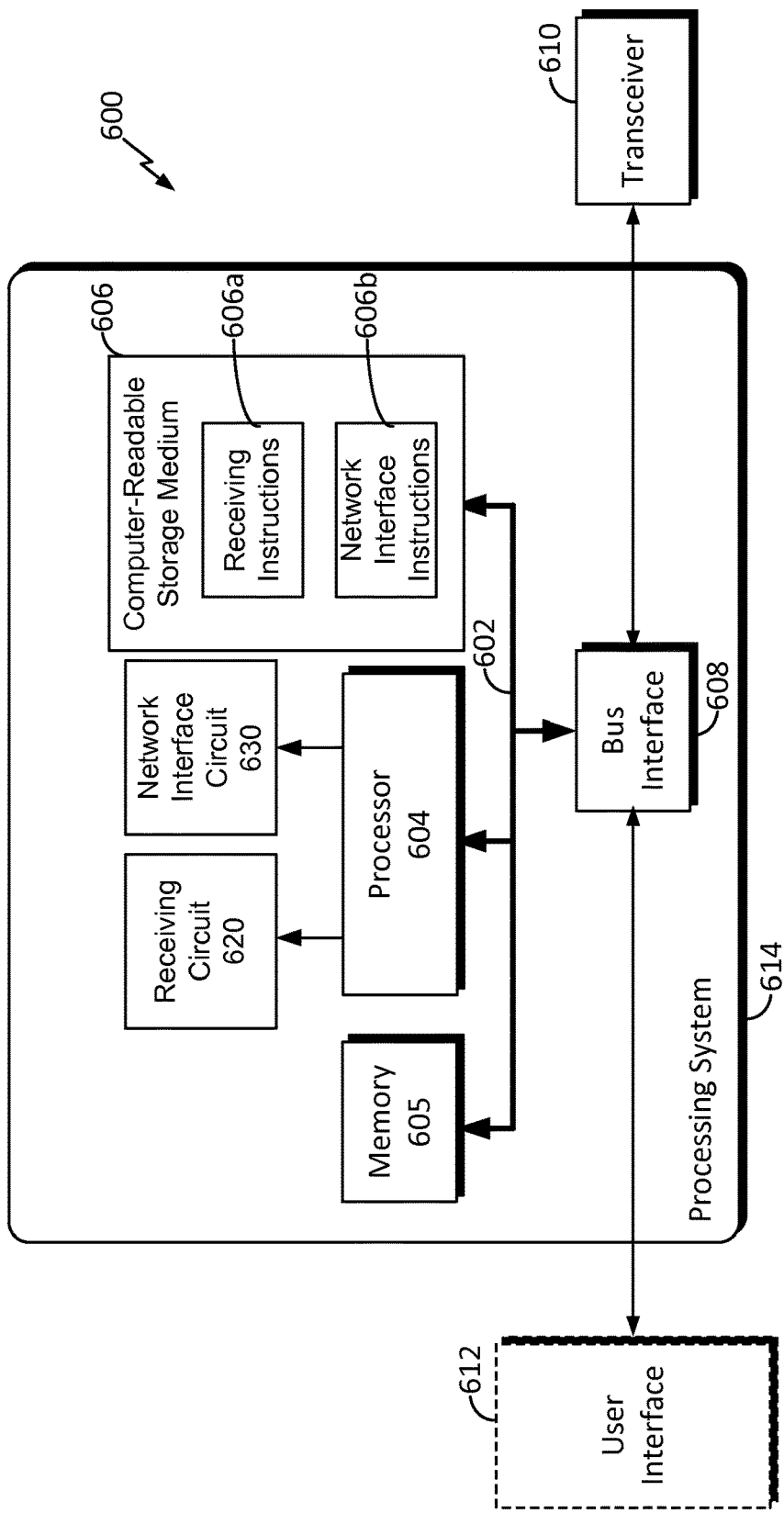
FIG. 6 is a block diagram illustrating an example of a hardware implementation for an access point device employing a processing system.

Referring next to FIG. 6, a conceptual diagram illustrating an example of a hardware implementation for an AP device 600 employing a processing system 614 is provided. It is contemplated that AP device 600 may be any AP device configured to include the aspects disclosed herein including, for example, any of the enhanced router devices discussed with reference to FIGS. 1-5. In accordance with various aspects of the disclosure, an element, or any portion of an element, or any combination of elements may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 604, as utilized in AP device 600, may be used to implement any one or more of the processes described below and illustrated in any of FIGS. 7-9.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

In an aspect of the disclosure, computer-readable medium 606 is configured to include various instructions 606a and/or 606b to facilitate automating an onboarding procedure, as shown. In a similar aspect, such automating can instead be implemented via hardware by coupling processor 604 to any of circuits 620 and/or 630, as shown. Moreover, it is contemplated that the automating may be performed by any combination of instructions 606a and/or 606b, as well as any combination of circuits 620 and/or 630.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
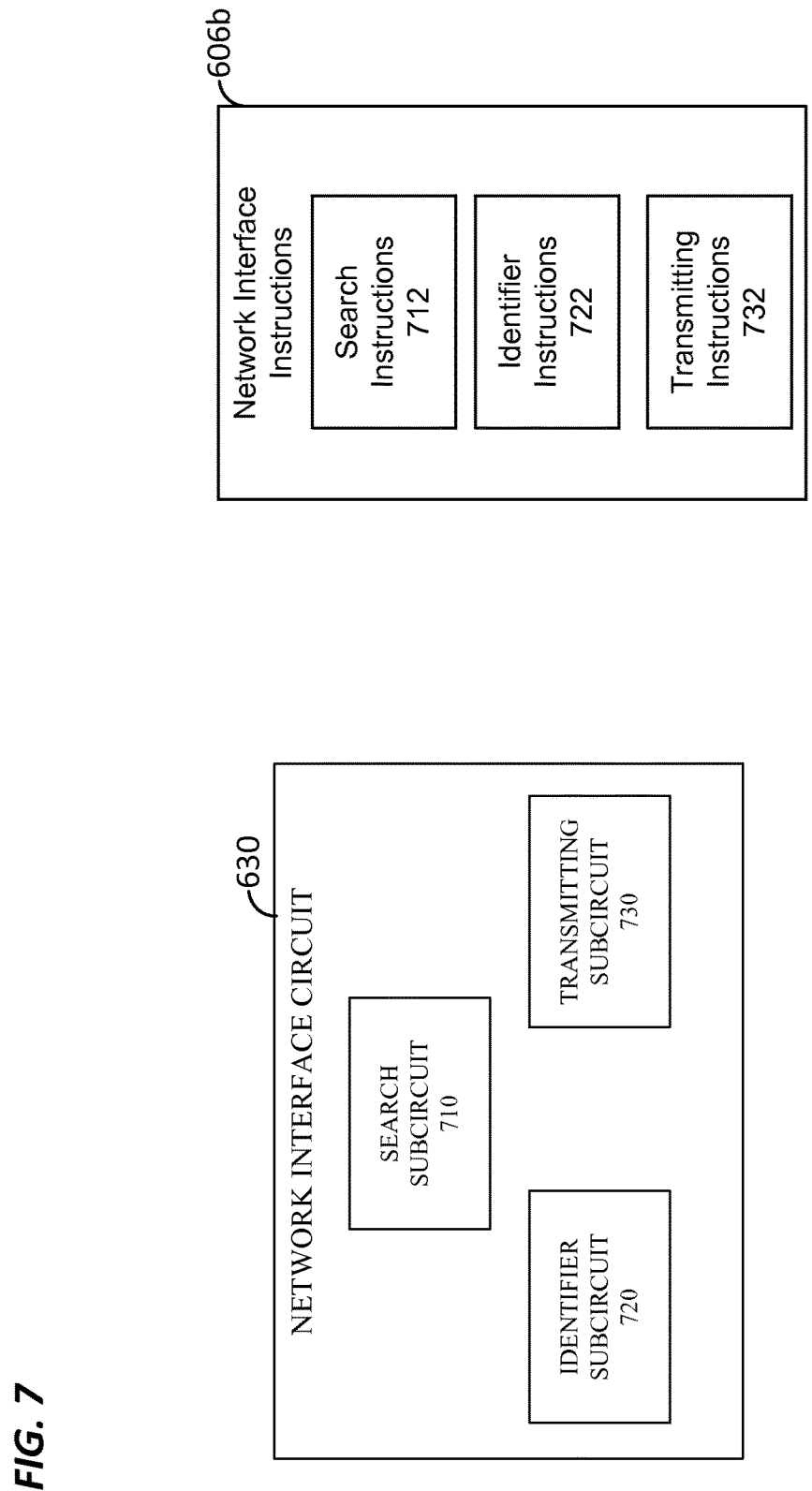
FIG. 7 is a block diagram illustrating exemplary network interface components of an access point device according to an aspect of the disclosure.

It is contemplated that AP device 600 may be implemented as an enhanced router device in accordance with any of the various aspects discussed previously with reference to FIGS. 1-5. To facilitate such implementations, receiving instructions 606a and/or receiving circuit 620 may be configured to receive an administrative communication associated with onboarding an onboardable device, whereas network interface instructions 606b and/or network interface circuit 630 may be configured to enable the onboardable device to access a secure network via AP device 600 based on the administrative communication. Here, it is contemplated that the administrative communication originates from an entity different than the onboardable device attempting to onboard AP device 600. Furthermore, as illustrated in FIG. 7, each of network interface circuit 630 and network interface instructions 606b may further comprise any of a plurality of subcomponents to facilitate implementing the aspects disclosed herein. For instance, network interface circuit 630 may comprise search sub-circuit 710, identifier sub-circuit 720, and transmitting sub-circuit 730, whereas network interface instructions 606b may comprise search instructions 712, identifier instructions 722, and transmitting instructions 732.

In a first exemplary implementation, it is contemplated that AP device 600 may automate the onboarding process by actively search for onboardable devices. To facilitate such implementation search sub-circuit 710 and/or search instructions 712 may be configured to detect a signal transmitted from an onboardable device during an AP mode operation of the onboardable device. Identifier sub-circuit 720 and/or identifier instructions 722 may then be configured to extrapolate an identifier (e.g., an SSID broadcast by the onboardable device during an AP mode operation) from the signal, whereas transmitting sub-circuit 730 and/or transmitting instructions 732 may be configured to provide the identifier to an administrative entity. In this particular implementation, the administrative communication is received from the administrative entity in response to having received the extrapolated identifier associated with the detected onboardable device. Namely, the administrative communication comprises an indication from the administrator as to whether the detected onboardable device should be granted access to the administrator's personal secure network via AP device 600. Access to the secure network is thus authorized, if the response includes an authorization from the administrative entity to onboard the onboardable device. Transmitting sub-circuit 730 and/or transmitting instructions 732 may then be configured to transmit Wi-Fi credentials associated with the secure network to the onboardable device. Otherwise, until such authorization is received, network interface circuit 630 and/or network interface instructions 606b may be configured to establish a temporary connection between the onboardable device and the secure network, wherein the temporary connection is media access control (MAC) filtered.

Figure 8:
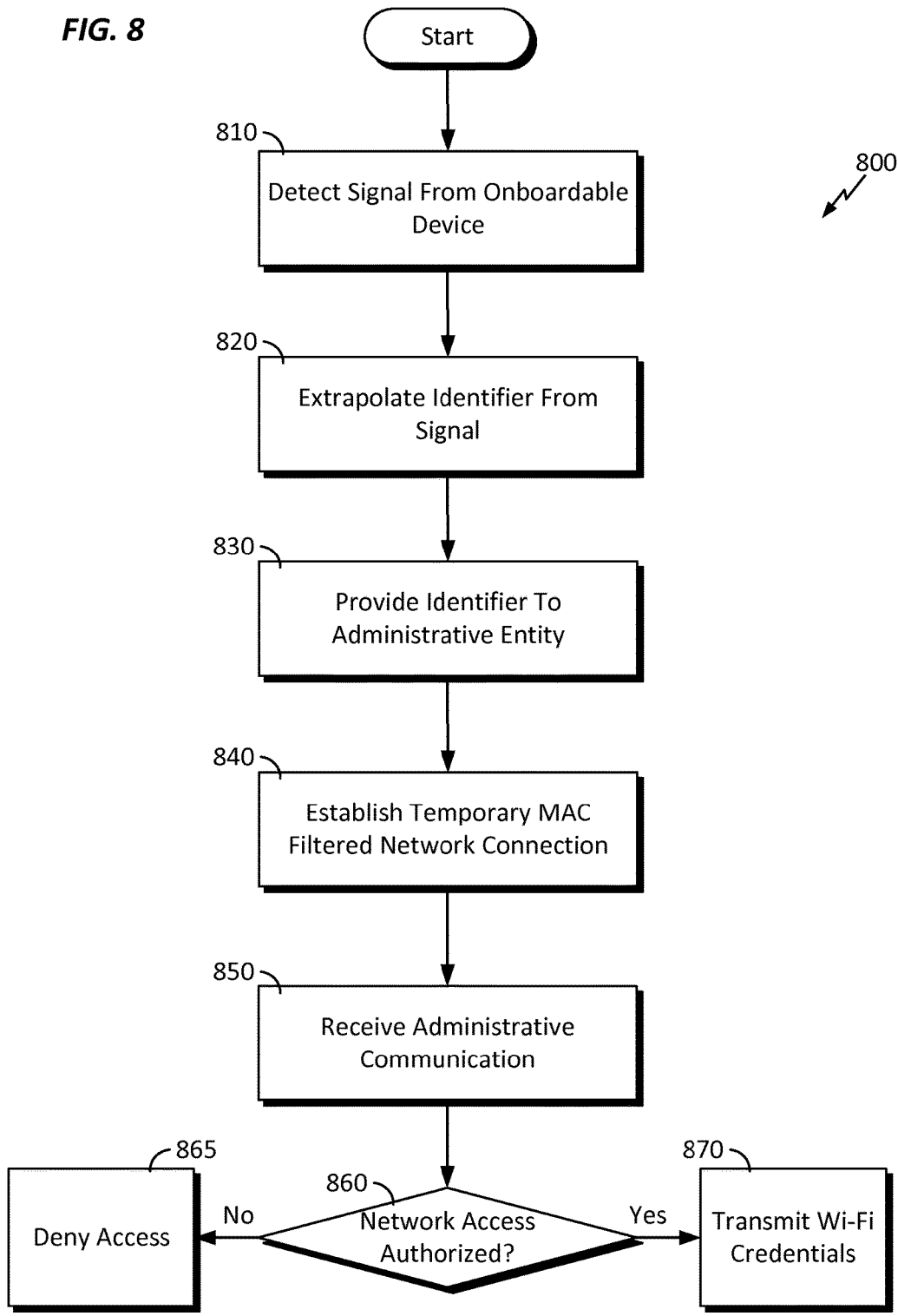
FIG. 8 is a flow diagram illustrating a first exemplary procedure for automating an onboarding of an onboardable device from an access point device according to an aspect of the disclosure.

Referring next to FIG. 8, a flow diagram illustrating an exemplary process for automating the onboarding of an onboardable device from an AP device according to the aforementioned aspect of the disclosure is provided. As illustrated, process 800 includes a series of acts that may be performed within a computing device (e.g., enhanced router 120, AP device 600, etc.) according to an aspect of the subject specification. For instance, process 800 may be implemented by employing a processor to execute computer executable instructions stored on a computer readable storage medium to implement the series of acts. In another implementation, a computer-readable storage medium comprising code for causing at least one computer to implement the acts of process 800 is contemplated.

As illustrated, process 800 begins at act 810 with the detection of a signal from an onboardable device. As stated previously, such signal may be a signal broadcast by the onboardable device while operating in an AP mode, wherein the signal includes the onboardable device's SSID. At act 820, an identifier associated with the onboardable device (e.g., an SSID associated with the onboardable device) is extrapolated from the detected signal. The identifier is then provided to an administrative entity at act 830 for authorization. After sending the identifier, process 800 proceeds to act 840 where a temporary MAC-filtered connection with the onboardable device is established. This temporary connection is maintained until a response from the administrative entity is received at act 850. Then, at act 860, the response is evaluated to determine whether network access was authorized. If authorization was granted, process 800 concludes at act 870 where Wi-Fi credentials for accessing the network are transmitted to the onboardable device. Otherwise, if authorization is not granted, process 800 concludes at act 865 where access to the network is denied.

In another exemplary implementation, it is contemplated that AP device 600 may receive an onboardable device's identifier from an administrator, rather than from the onboardable device. To facilitate such implementation identifier sub-circuit 720 and/or identifier instructions 722 may be configured to extrapolate such identifier from an administrative communication received from the administrator, whereas transmitting sub-circuit 730 and/or transmitting instructions 732 may be configured to transmit both the identifier and Wi-Fi credentials to the onboardable device. As stated previously, the onboardable device may then compare the received identifier with an internally stored identifier, wherein the onboarding will depend on whether these two identifiers match. To this end, it should be noted that identifier sub-circuit 720 and/or identifier instructions 722 may be configured to extrapolate an identifier in any of a plurality of ways, wherein such identifier can be an SSID associated with the onboardable device or any other type of identifier that may uniquely identify the onboardable device for authorization purposes. For instance, identifier sub-circuit 720 and/or identifier instructions 722 may be configured to extrapolate the identifier from a video signal (e.g., a screen flashing white/black at a known clock speed could be used to transmit ASCII data), an audio signal (e.g., audible or ultrasonic pulses), a text entry (e.g., corresponding to an alphanumeric code labeled on the onboardable device, and/or included in a packaging of the onboardable device), or image (e.g., a photo of an alphanumeric code labeled on the onboardable device, and/or included in a packaging of the onboardable device) included in the received administrative communication. Alternatively, if a barcode or QR code is used, identifier sub-circuit 720 and/or identifier instructions 722 may be configured to extrapolate the identifier from received data corresponding to a barcode reading included in the administrative communication.

Figure 9:
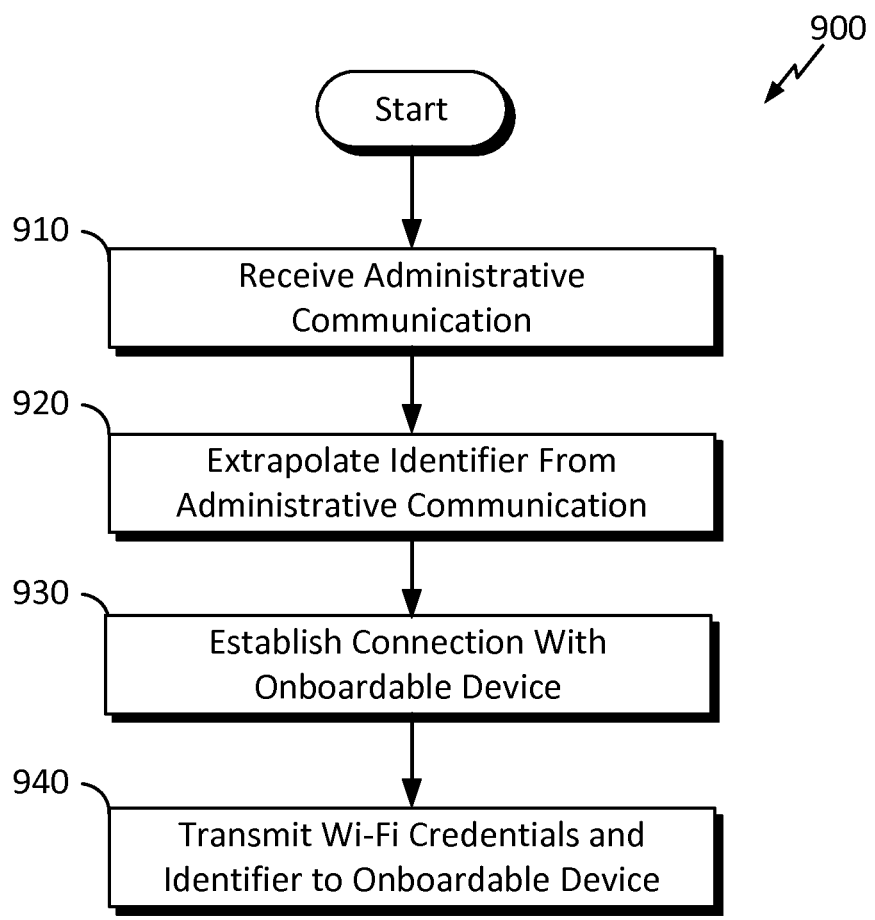
FIG. 9 is a flow diagram illustrating a second exemplary procedure for automating an onboarding of an onboardable device from an access point device according to an aspect of the disclosure.

Referring next to FIG. 9, a flow diagram illustrating an exemplary process for automating the onboarding of an onboardable device from an AP device according to the aforementioned aspect of the disclosure is provided. Similar to process 800, process 900 includes a series of acts that may be performed within a computing device (e.g., enhanced router 120, AP device 600, etc.) according to an aspect of the subject specification. For instance, process 900 may be implemented by employing a processor to execute computer executable instructions stored on a computer readable storage medium to implement the series of acts. In another implementation, a computer-readable storage medium comprising code for causing at least one computer to implement the acts of process 900 is contemplated.

As illustrated, process 900 begins at act 910 where an administrative communication is received from an administrative entity. Next, at act 920 an identifier associated with an onboardable device is extrapolated from the administrative communication. As stated previously, such extrapolation may comprise extrapolating the identifier from any of a plurality of inputs including, but not limited to, a video signal, an audio signal, a text entry, an image, or barcode. Once the identifier is extrapolated, process 900 continues to act 930 where a connection with the onboardable device associated with the extrapolated identifier is established. Process 900 then concludes with the extrapolated identifier being transmitted to the onboardable device, together with Wi-Fi credentials.

Figure 10:
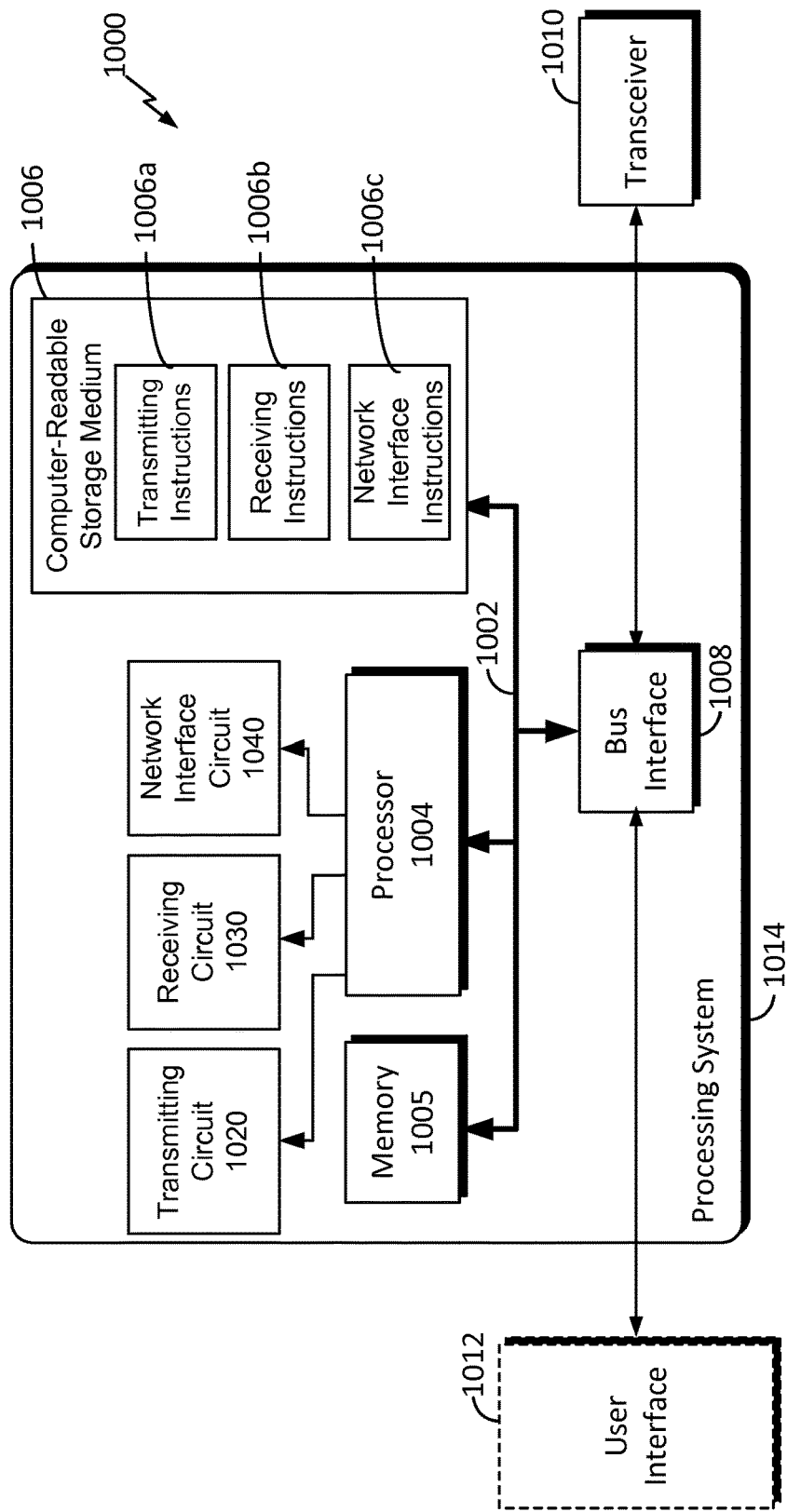
FIG. 10 is a block diagram illustrating an example of a hardware implementation for an onboardable device employing a processing system.

Referring next to FIG. 10, a conceptual diagram illustrating an example of a hardware implementation for an onboardable device 1000 employing a processing system 1014 is provided. It is contemplated that onboardable device 1000 may be any onboardable device configured to include the aspects disclosed herein including, for example, any of the onboardable devices discussed with reference to FIGS. 1-5. It is further contemplated that the processor 1004, as utilized in onboardable device 1000, may be used to implement any one or more of the processes described below and illustrated in any of FIGS. 11-14.

In an aspect of the disclosure, computer-readable medium 1006 is configured to include various instructions 1006a, 1006b, and/or 1006c to facilitate automating an onboarding procedure, as shown. In a similar aspect, such automating can instead be implemented via hardware by coupling processor 1004 to any of circuits 1020, 1030, and/or 1030, as shown. Moreover, it is contemplated that the automating may be performed by any combination of instructions 1006a, 1006b, and/or 1006c, as well as any combination of circuits 1020, 1030, and/or 1030. It should also be appreciated that, because many of the components illustrated in FIG. 10 are generally analogous to corresponding components described for AP device 600 with reference to FIG. 6, a detailed discussion of such analogous FIG. 10 components is omitted here.

Figure 11:
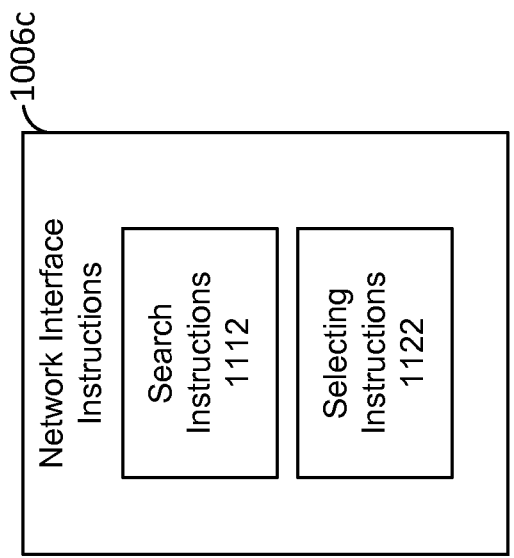
FIG. 11 is a block diagram illustrating exemplary network interface components of an onboardable device according to an aspect of the disclosure.
Figure 11:
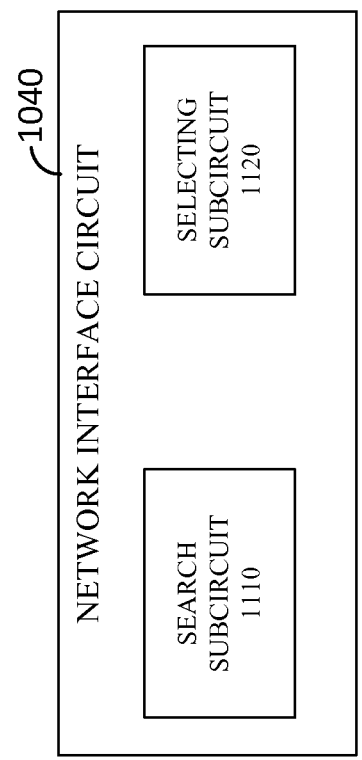

As discussed below, onboardable device 1000 may be configured in any of a plurality of ways to facilitate automating the onboarding procedure. For instance, in an exemplary implementation, transmitting instructions 1006a and/or transmitting circuit 1020 may be configured to transmit an identifier associated with onboardable device 1000 (e.g., an SSID associated with onboardable device 1000) while onboardable device 1000 operates in an AP mode; receiving instructions 1006b and/or receiving circuit 1030 may be configured to receive credentials associated with accessing a secure network via an AP device; and network interface instructions 1006c and/or network interface circuit 1040 may be configured to connect to the secure network by utilizing the credentials. For this particular implementation, the credentials received from the AP device are received in response to an authentication of the identifier transmitted by onboardable device 1000. Furthermore, as illustrated in FIG. 11, each of network interface instructions 1006c and network interface circuit 1040 may further comprise any of a plurality of subcomponents to facilitate implementing the aspects disclosed herein. For instance, network interface circuit 1040 may comprise search sub-circuit 1110 and selecting sub-circuit 1120, whereas network interface instructions 1006c may comprise search instructions 1112 and selecting instructions 1122.

Figure 12:
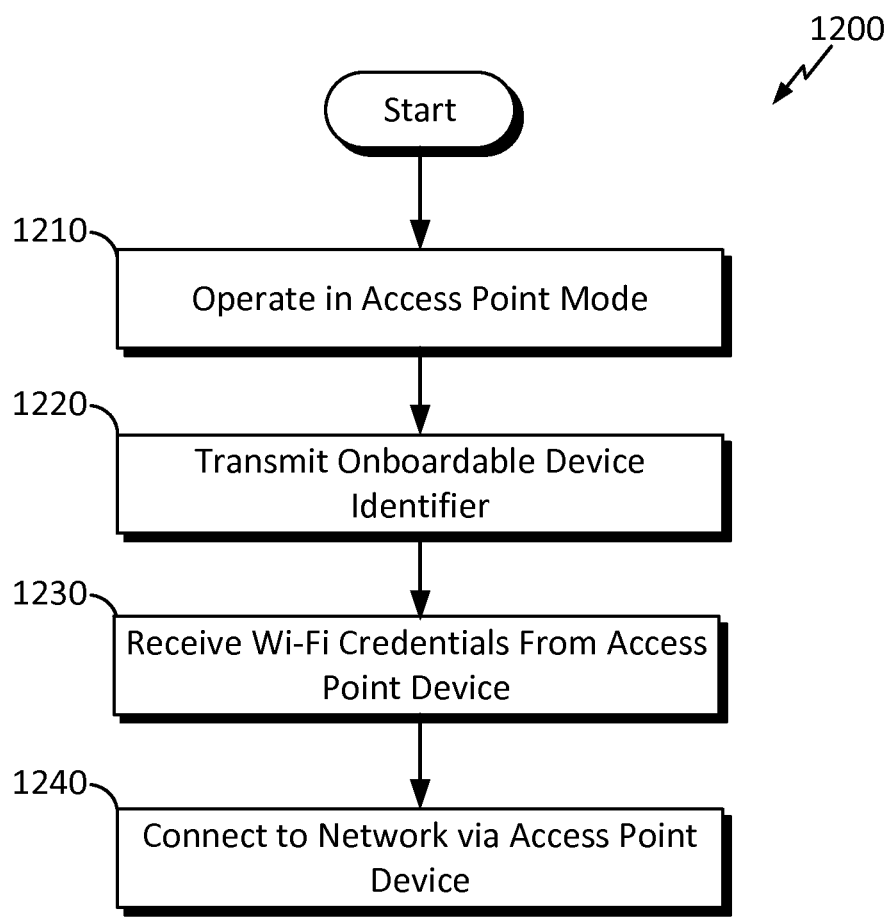
FIG. 12 is a flow diagram illustrating a first exemplary procedure for automating an onboarding process from an onboardable device according to an aspect of the disclosure.

Referring next to FIG. 12, a flow diagram illustrating an exemplary process for automating the onboarding of an onboardable device according to the aforementioned aspect of the disclosure is provided. Similar to processes 800 and 900, process 1200 includes a series of acts that may be performed within a computing device (e.g., onboardable device 110, onboardable device 1000, etc.) according to an aspect of the subject specification. For instance, process 1200 may be implemented by employing a processor to execute computer executable instructions stored on a computer readable storage medium to implement the series of acts. In another implementation, a computer-readable storage medium comprising code for causing at least one computer to implement the acts of process 1200 is contemplated.

As illustrated, process 1200 begins at act 1210 where the onboardable device operates in an AP mode. While operating in AP mode, the onboardable device then transmits a corresponding identifier at act 1220 (e.g., an SSID broadcast from the onboardable device). An AP device that detects this transmission may then forward the identifier to an administrator for authorization to access the administrator's secure network, as discussed above. If authorization is granted, an indicator of such authorization is provided to the AP device. The onboardable device then receives Wi-Fi credentials from the AP device at act 1230, and subsequently concludes at act 1240 where it connects to the administrator's secure network via the AP device by utilizing the Wi-Fi credentials received at act 1230.

In another exemplary implementation, it is contemplated that onboardable device 1000 may be configured to match an identifier received from an AP device to an internally stored identifier before onboarding, as discussed above. To facilitate this implementation receiving instructions 1006*b* and/or receiving circuit 1030 may be further configured to receive such identifier from an AP device, whereas network interface instructions 1006*c* and/or network interface circuit 1040 may be configured to connect to the AP device's secure network based on whether the received identifier matches the identifier internally stored by onboardable device 1000.

Figure 13:
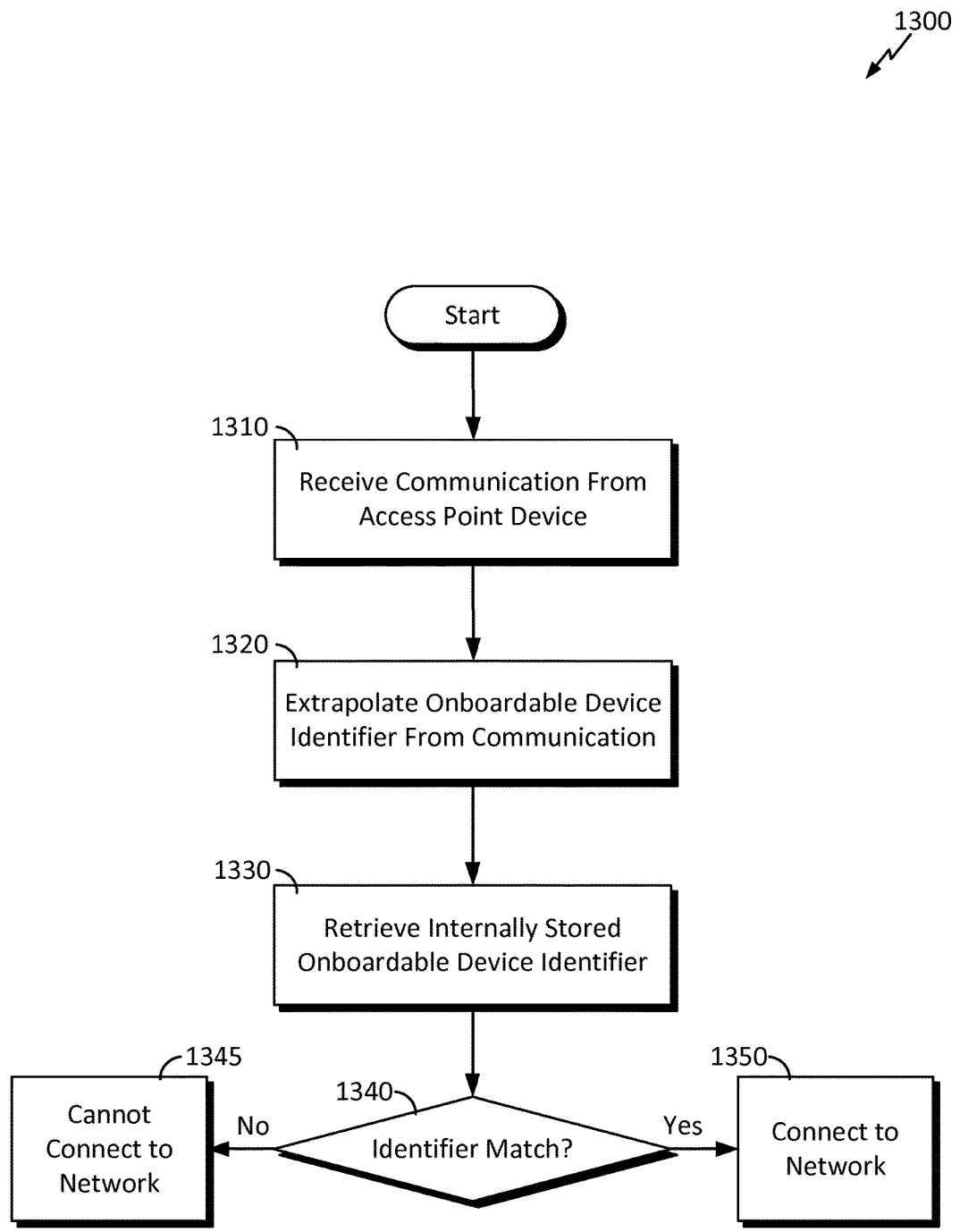
FIG. 13 is a flow diagram illustrating a second exemplary procedure for automating an onboarding process from an onboardable device according to an aspect of the disclosure.

Referring next to FIG. 13, a flow diagram illustrating the above exemplary process is provided. Similar to processes 800, 900, and 1200, process 1300 includes a series of acts that may be performed within a computing device (e.g., onboardable device 110, onboardable device 1000, etc.) according to an aspect of the subject specification. For instance, process 1300 may be implemented by employing a processor to execute computer executable instructions stored on a computer readable storage medium to implement the series of acts. In another implementation, a computer-readable storage medium comprising code for causing at least one computer to implement the acts of process 1300 is contemplated.

As illustrated, process 1300 begins at act 1310 where the onboardable device receives a communication from an AP device. Here, it is contemplated that such communication includes both an onboardable device identifier and Wi-Fi credentials for accessing a secure network via the AP device. After receiving this communication, the onboardable device proceeds by extrapolating the onboardable device identifier from the communication, at act 1320. At act 1330, the onboardable device then retrieves its internally stored identifier, which it subsequently compares to the received onboardable device identifier at act 1340. If the two identifiers match, process 1300 concludes at act 1350 where the onboardable device connects to the AP device's secure network by utilizing the Wi-Fi credentials received from the AP device. Otherwise, if the two identifiers do not match, process 1300 concludes at act 1345 where access to the network is denied.

In yet another exemplary implementation, it is contemplated that onboardable device 1000 may be configured to perform a search of AP devices, as discussed above. To facilitate this implementation search instructions 1112 and/or search sub-circuit 1110 may be further configured to perform an AP device scan while onboardable device 1000 operates in a Wi-Fi mode, whereas transmitting instructions 1006*a* and/or transmitting circuit 1020 may be configured to trigger a transmission of the identifier upon detecting an AP device. In an aspect of the disclosure, if only one AP device is detected, network interface instructions 1006*c* and/or network interface circuit 1040 may be configured to connect to this AP device by switching to AP mode and waiting to be onboarded. For some implementations, where only one AP device is detected, onboardable device 1000 may be further required to ascertain whether the detected AP device is of a particular type. For instance, onboardable device 1000 may be configured to onboard the detected AP device only if it is an enhanced router, such as enhanced router 120 or AP device 600. In an aspect of the disclosure, onboardable device 1000 may be configured to ascertain whether an AP device is an enhanced router by extrapolating an AP device type identifier from a signal transmitted by the AP device. For this particular implementation, any of the aforementioned enhanced router devices (e.g., enhanced router 120, AP device 600, etc.) may be further configured to broadcast an identifier detectable by onboarder devices, which distinguishes the enhanced router device from generic router devices.

If multiple AP devices are detected, selecting instructions 1122 and/or selecting sub-circuit 1120 may be configured to select an onboarder device from the plurality of detected AP devices. For this particular implementation, receiving instructions 1006*b* and/or receiving circuit 1030 may be configured to receive credentials associated with the selected onboarder device, whereas network interface instructions 1006*c* and/or network interface circuit 1040 may be configured to connect to the selected onboarder device's secure network.

Here, it is contemplated that selecting instructions 1122 and/or selecting sub-circuit 1120 may be configured to select an onboarder device according to any of a plurality of algorithms. For instance, a distance-based algorithm may be used, wherein selecting instructions 1122 and/or selecting sub-circuit 1120 may be configured to determine whether at least one of the plurality of detected AP devices is within a threshold distance (e.g., determining whether an AP device is in a room having dimensions corresponding to the threshold distance). Alternatively, rather than determining whether a detected AP device is within a threshold distance, selecting instructions 1122 and/or selecting sub-circuit 1120 may be configured to determine compare its respective estimated distances from two candidate AP devices, wherein the AP device deemed to be closest is selected.

Figure 14:
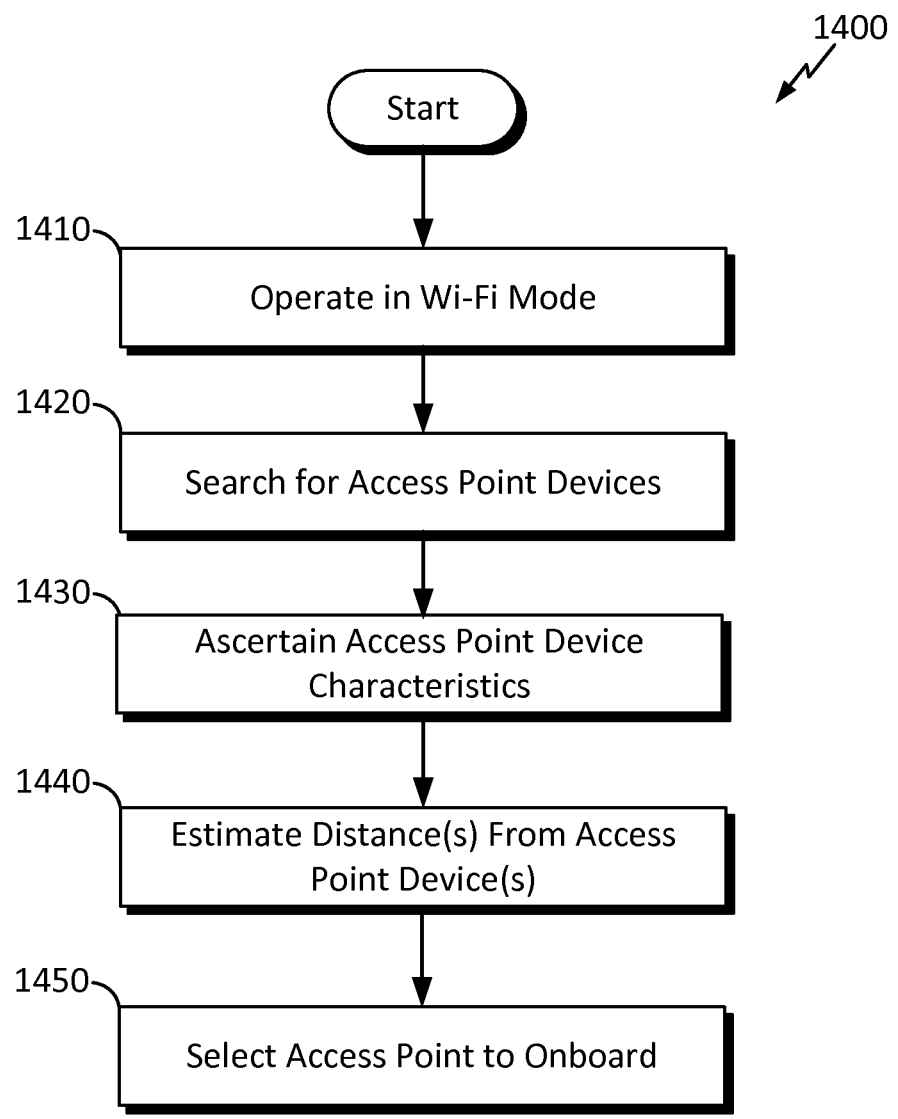
FIG. 14 is a flow diagram illustrating a third exemplary procedure for automating an onboarding process from an onboardable device according to an aspect of the disclosure.

Referring next to FIG. 14, a flow diagram illustrating the above exemplary process is provided. Similar to processes 800, 900, 1200, and 1300, process 1400 includes a series of acts that may be performed within a computing device (e.g., onboardable device 110, onboardable device 1000, etc.) according to an aspect of the subject specification. For instance, process 1400 may be implemented by employing a processor to execute computer executable instructions stored on a computer readable storage medium to implement the series of acts. In another implementation, a computer-readable storage medium comprising code for causing at least one computer to implement the acts of process 1400 is contemplated.

As illustrated, process 1400 begins at act 1410 where the onboardable device operates in a Wi-Fi mode. While operating in Wi-Fi mode, the onboardable device then searches for AP devices at act 1420. In an aspect of the disclosure, before selecting a particular AP device to onboard, the onboardable device collects data associated with the AP devices it detects. For instance, at act 1430, the onboardable device ascertains device-specific characteristics of the detected AP devices (e.g., whether the AP device is a generic router or an enhanced router), whereas the onboardable device may estimate respective distances from the detected AP devices, at act 1440. Based on the data collected/computed, the onboardable device may then select which AP device to onboard, at act 1450.

Several aspects of a telecommunications system have been presented with reference to a system utilizing a peer-to-peer architecture (e.g., an AllJoyn architecture) and a Wi-Fi (e.g., 802.11) air interface. As those skilled in the art will readily appreciate, various aspects described throughout this disclosure may be extended to other communication systems, network architectures and communication standards.

By way of example, various aspects may be extended to other systems such as those employing Long Term Evolution (LTE) (in FDD, TDD, or both modes), LTE-Advanced (LTE-A) (in FDD, TDD, or both modes), Universal Mobile Telecommunications Systems (UMTS), Global System for Mobile (GSM), CDMA2000, Evolution-Data Optimized (EV-DO), Ultra Mobile Broadband (UMB), IEEE 802.16 (WiMAX), IEEE 802.20, Ultra-Wideband (UWB), Bluetooth, and/or other suitable systems. The actual communication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method comprising:
   receiving, at an access point (AP) device within a Wi-Fi network, an administrative communication associated with onboarding an onboardable device from an onboarded device onboarded to the AP device, the administrative communication originating from the onboarded device and being received at the AP device directly from the onboarded device via a peer-to-peer framework of the Wi-Fi network, wherein the onboarded device is different than the onboardable device and the onboarded device comprises a single device within the Wi-Fi network;
   extrapolating, by the AP device, an identifier that identifies the onboardable device from the administrative communication; and
   connecting, by the AP device, the onboardable device to a secure network via the AP device by transmitting the identifier and access credentials associated with the secure network to the onboardable device, wherein upon connecting to the secure network, the onboardable device communicates with the secure network via the AP device, wherein the onboardable device is connected to the secure network via the AP device upon performing an AP device scan while the onboardable device operates in a Wi-Fi mode and selecting the AP device from a plurality of detected AP devices upon receiving the onboardable device identifier from the AP device.

2. The method according to claim 1, wherein the identifier is a service set identifier (SSID) associated with the onboardable device.

3. The method according to claim 1, wherein the extrapolating comprises extrapolating the identifier from at least one of a video signal, an audio signal, a text entry, or an image included in the administrative communication.

4. The method according to claim 1, wherein the extrapolating comprises extrapolating the identifier from received data corresponding to a barcode or QR code reading included in the administrative communication.

5. An access point (AP) device within a Wi-Fi network comprising:
   a receiving circuit configured to receive an administrative communication associated with onboarding an onboardable device from an onboarded device onboarded to the AP device, the administrative communication originating from the onboarded device and being received at the AP device directly from the onboarded device via a peer-to-peer framework of the Wi-Fi network, wherein the onboarded device is different than the onboardable device and the onboarded device comprises a single device within the Wi-Fi network;

an identifier circuit configured to extrapolate an identifier that identifies the onboardable device from the administrative communication;

a network access circuit configured to connect the onboardable device to a secure network via the AP device based on the administrative communication, wherein upon connecting to the secure network, the onboardable device communicates with the secure network via the AP; and a transmitting circuit configured to transmit the identifier and access credentials associated with the secure network to the onboardable device;

wherein the onboardable device is connected to the secure network via the AP device upon performing an AP device scan while the onboardable device operates in a Wi-Fi mode and selecting the AP device from a plurality of detected AP devices upon receiving the onboardable device identifier from the AP device.

6. The AP device according to claim 5, wherein the identifier is a service set identifier (SSID) associated with the onboardable device.

7. The AP device according to claim 5, wherein the identifier circuit is configured to extrapolate the identifier from at least one of a video signal, an audio signal, a text entry, or an image included in the administrative communication.

8. The AP device according to claim 5, wherein the identifier circuit is configured to extrapolate the identifier from received data corresponding to a barcode reading included in the administrative communication.

9. An onboardable device comprising:

a receiving circuit configured to receive an onboardable device identifier and credentials associated with accessing a secure network from an access point (AP) device within a Wi-Fi network, the credentials received from the AP device in response to the AP device receiving the onboardable device identifier directly from an onboarded device onboarded to the AP device via a peer-to-peer framework of the Wi-Fi network, wherein the onboarded device is different than the onboardable device and the onboarded device comprises a single device within the Wi-Fi network; and a network interface circuit configured to connect to the secure network via the AP device by utilizing the credentials based on whether the onboardable device identifier matches an internally stored identifier that identifies the onboardable device, wherein upon connecting to the secure network, the onboardable device communicates with the secure network via the AP device;

wherein the network interface circuit further comprises a search circuit configured to perform an AP device scan while the onboardable device operates in a Wi-Fi mode;

wherein the network interface circuit further comprises a selecting circuit configured to select the AP device from a plurality of detected AP devices upon receiving the onboardable device identifier from the AP device.

10. The onboardable device according to claim 9, wherein the identifier is a service set identifier (SSID) associated with the onboardable device.

* * * * *